United States Patent
Halas et al.

[11] Patent Number: 6,010,153
[45] Date of Patent: Jan. 4, 2000

[54] HYBRID INFLATOR FOR AIRBAGS

[75] Inventors: Jonathan P. Halas; Mark C. Horton, both of Lakeland; Mark Spangler, Plant City, all of Fla.

[73] Assignee: Breed Automotive Technology, Inc., Lakeland, Fla.

[21] Appl. No.: 08/804,442

[22] Filed: Feb. 21, 1997

[51] Int. Cl.[7] .................................................. B60R 21/26
[52] U.S. Cl. ...................... 280/737; 280/741; 137/68.13
[58] Field of Search .................................. 280/737, 741, 280/736, 740, 742; 137/68.13, 68.19, 68.23, 68.25, 68.26, 68.3; 222/3, 5

[56] References Cited

U.S. PATENT DOCUMENTS

| | | | |
|---|---|---|---|
| 5,022,674 | 6/1991 | Frantom et al. | 280/737 |
| 5,076,607 | 12/1991 | Woods et al. | 280/737 |
| 5,131,680 | 7/1992 | Coultas et al. | 280/737 |
| 5,290,060 | 3/1994 | Smith | 280/737 |
| 5,470,104 | 11/1995 | Smith et al. | 280/737 |
| 5,542,702 | 8/1996 | Green et al. | 280/737 |
| 5,577,769 | 11/1996 | Di Giacomo et al. | 280/736 |
| 5,601,309 | 2/1997 | Bender et al. | 280/737 |
| 5,601,310 | 2/1997 | Di Giacomo et al. | 280/741 |
| 5,602,361 | 2/1997 | Hamilton et al. | 102/288 |
| 5,653,463 | 8/1997 | Jeong | 280/737 |

*Primary Examiner*—Peter C. English
*Attorney, Agent, or Firm*—Lonnie R. Drayer; Berth A. Vrioni

[57] ABSTRACT

A hybrid inflator, includes a storage chamber for storing a pressurized gas and a pyrotechnic heater assembly which has a solid gas generating material within a combustion chamber. Forming the outer layer of the pyrotechnic heater assembly is a diffuser, which is inserted into the storage vessel. A closure provides a pressure seal between the storage chamber and the combustion chamber. Upon receiving a control signal, an igniter ignites the solid gas generating material. The closure ruptures, allowing a mixture of hot generated gas and stored gas to discharge through the diffuser and flow into a vehicle occupant restraint.

18 Claims, 10 Drawing Sheets

HYBRID INFLATOR FOR AIRBAGS

The invention disclosed herein relates generally to methods and apparatuses for use in inflating vehicle occupant restraints, such as airbags, and more specifically to the type of inflator known as a hybrid inflator.

DESCRIPTION OF THE RELATED ART

Many types of inflators have been disclosed in the art for inflating a vehicle occupant restraint such as an airbag. There are three primary types of inflators. Pyrotechnic inflators derive a gas source from a combustible gas generating material which, upon ignition, generates a quantity of gas sufficient to inflate an airbag. Stored gas inflators utilize a quantity of stored pressurized gas which is selectively released to inflate an airbag. Hybrid inflators combine the use of a gas generating material and a quantity of stored pressurized gas to inflate an airbag.

Hybrid inflators known in the art are subject to certain disadvantages. They require an abundance of welds in assembly, many of which may be structural welds. Many hybrid inflators lack assembly flexibility. If, for example, there is a need for a hybrid inflator with a different gas output than those being constructed, an entirely different assembly is required. Additionally, known hybrid inflators require two sealing members. For example, U.S. Pat. No. 5,290,060 teaches a hybrid inflator which includes two sealing members.

U.S. Pat. No. 5,542,702 teaches a hybrid inflator which has a diaphragm sealed across the open end of a cylindrical bottle to form a chamber containing pressurized gas. A cup-shaped diffuser also has an open end secured to the open end of the bottle with the diaphragm secured therebetween. The diaphragm has an area which is substantially the same as the area of the open end of the cylindrical bottle.

The present invention provides methods and apparatuses for overcoming the disadvantages mentioned above. Thus, the difficulties inherent in the prior art are overcome in a way which is simple and efficient, while providing advantageous results.

SUMMARY OF THE INVENTION

A hybrid inflator in accordance with the present invention includes a storage chamber for storing an inflation gas which may be helium, argon, nitrogen or some other suitable inert gas. The hybrid inflator also includes a pyrotechnic heater assembly which has a solid gas generating material within a combustion chamber, an igniter, and a closure which provides a pressure seal between the storage chamber and a diffuser. The hybrid inflator of the present invention may optionally include a projectile for rupturing the closure. Upon receiving a control signal, the igniter ignites the solid gas generating material changing it to a hot gas which propels the projectile into the closure. The closure is ruptured, allowing a mixture of hot gas from the combustion chamber and stored inert gas from the storage chamber to discharge through the diffuser and flow into the vehicle occupant restraint.

One advantage of the present invention is that it minimizes the number of welds required during assembly of the device. Only three welds are required, and only one of the three welds is a structural weld.

Another advantage of the present invention is that it has great assembly flexibility. Any one of various sized storage chambers can be connected to the same pyrotechnic heater assembly. The pyrotechnic heater assembly is also flexible in that it can be easily connected to either a leadwire type igniter or a pin-type igniter.

Still another advantage of the present invention is that gases generated by a pyrotechnic charge act as a heater to the stored gas and as an initial gas charge to start unfolding the airbag.

Still another advantage of the present invention is that the attachment means of the diffuser housing and vessel housing forms an integral plenum eliminating the need for a deflector. This plenum evenly distributes the gas flow into an airbag.

Still another advantage of the present invention is that the funnel shape of the combustion chamber acts as a ballistic amplifier to concentrate and focus the hot generated gas exiting the combustion chamber.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DETAILED DESCRIPTION OF THE INVENTION

Figure 1:
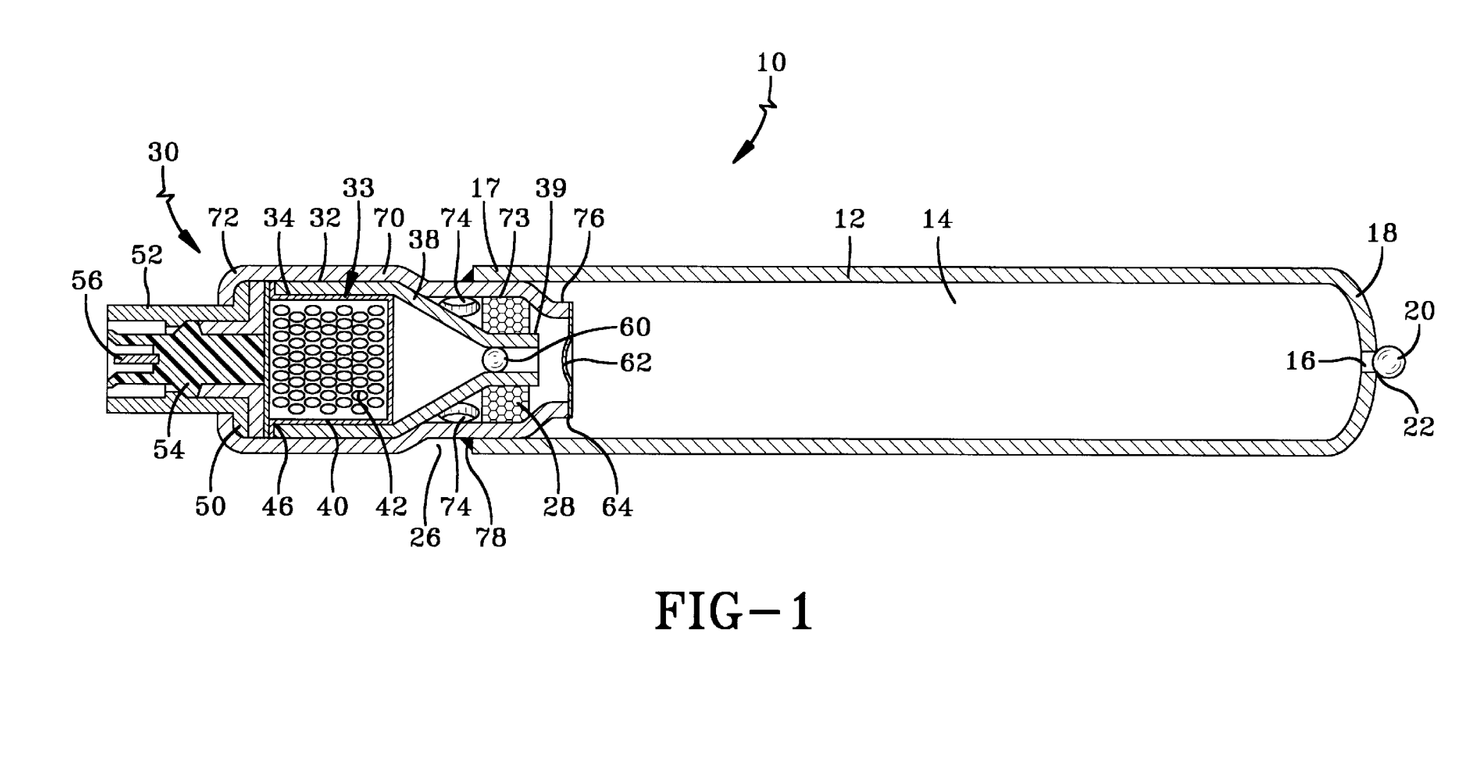
FIG. 1 is a longitudinal cross-sectional view of a first embodiment of a hybrid inflator of the present invention.
Figure 2:
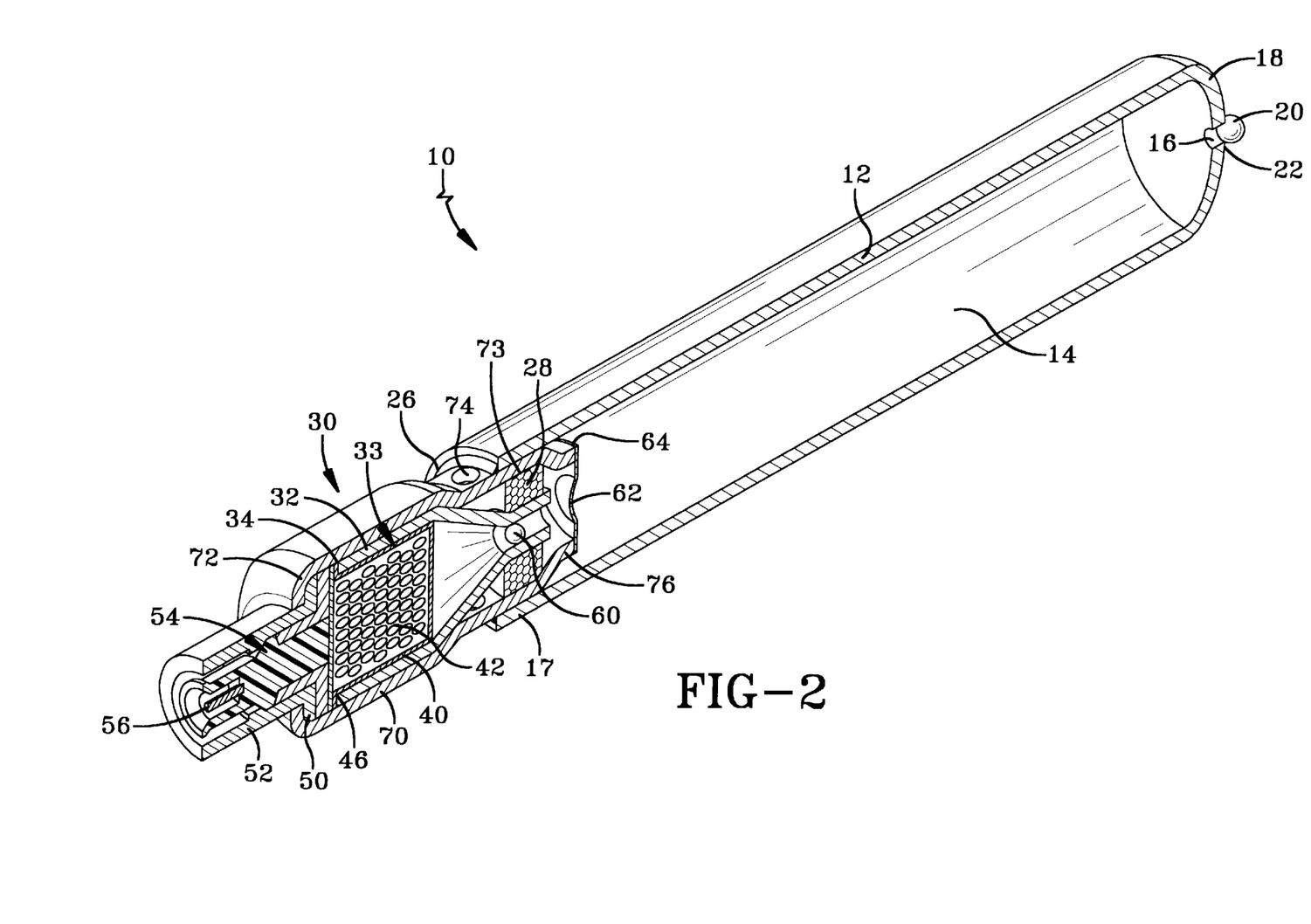
FIG. 2 is a perspective longitudinal crosssectional view of the hybrid inflator shown in FIG. 1.
Figure 3:
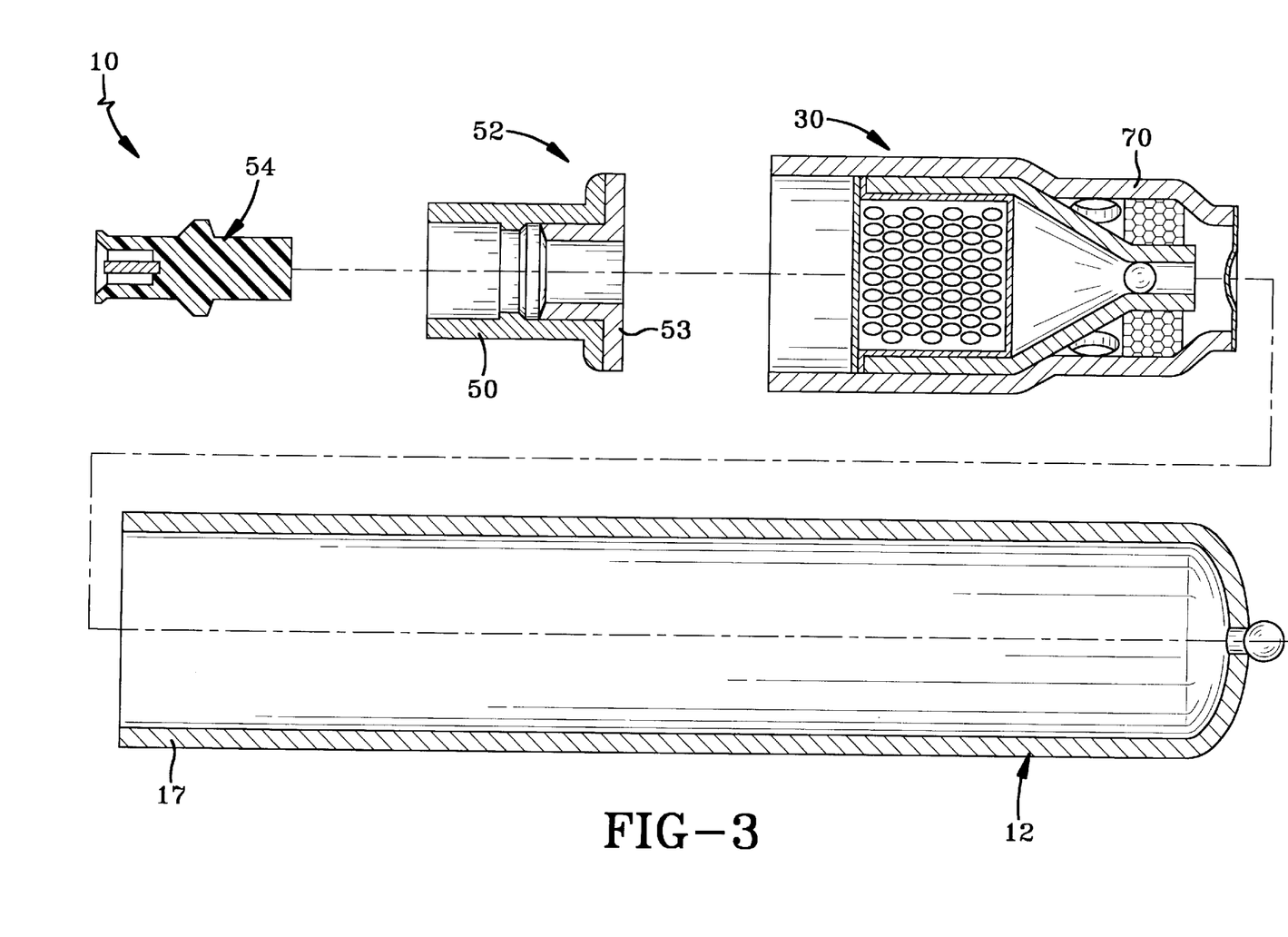
FIG. 3 is an exploded view of the hybrid inflator shown in FIG. 1.

FIGS. 1 and 2 show longitudinal cross-sectional views of a hybrid inflator 10 for inflating a vehicle occupant restraint such as an airbag, and FIG. 3 shows an exploded view of the hybrid inflator. All of the embodiments illustrated herein are for use with side airbags, but the invention is applicable to driver side frontal airbags, passenger side frontal airbags, and other applications as well.

The hybrid inflator 10 includes a pressure vessel 12 with a storage chamber 14 that is filled with helium, argon, nitrogen or any other suitable pressurized gas. While the pressure vessel shown has a generally cylindrical shape, it is understood that a pressure vessel having a spherical shape may also be used in the practice of the present invention. The storage chamber has a circular cross section. A fill port 16 located at a first end 18 of the vessel 12 is closed by a plug 20 which is attached to the vessel 12 by a weld 22. The vessel may be formed of stainless steel, low carbon steel or any other suitable material which has sufficient strength and extremely low permeability to the gas.

The hybrid inflator 10 also includes a pyrotechnic heater assembly 30. Forming the outer periphery of the pyrotechnic heater assembly 30 is a generally cylindrical diffuser 70. The diffuser may be formed of stainless steel, low carbon steel or any other suitable material having sufficient structural strength. The generally cylindrical diffuser is telescopically inserted into the generally cylindrical vessel. The diffuser is connected to the cylindrical vessel by a circumferential weld 78, which is preferably a fillet weld. That is to say, the open end 17 of the vessel 12 is joined in sealing relation with the diffuser 70 by a circumferential weld 78.

The diffuser has a reduced diameter portion which is located inside the generally cylindrical vessel and defines a circular opening having an area which is in the range of 40% to 60% of the area of the circular cross section of said storage chamber. The end 76 of the diffuser which is located inside the vessel is assembled with a closure 62 which seals the pressurized gas within the storage chamber 14. The closure is preferably formed of stainless steel or any other material which is corrosion resistant, has extremely low permeability to the stored gas, and has stable mechanical properties over a wide range of temperatures. The closure is plastically deformable, as shown in the drawings, by the pressure exerted by the inert gas in the storage chamber. The closure 62 is attached to the diffuser 70 by a weld 64. A second end 72 of the diffuser 70 is crimped over an igniter retainer assembly 52.

A plenum 26 is formed by the pressure vessel 12 and the diffuser 70. The plenum 26 is formed by: (a) the end of the larger diameter section of the diffuser housing; (b) the reduced diameter section of the diffuser housing; and the proximal end of the pressure vessel. The plenum simplifies the finished assembly of the airbag module, thus reducing costs. By having an integral plenum, no air gap is needed around the inflator. The diffuser 70 has a plurality of openings 74 therethrough for venting gas from the inflator to a vehicle occupant restraint. The annulus, or plenum, which is outside the diffuser in juxtaposition with the openings 74 allows the gas to evenly disperse in 360° of direction. This allows the airbag to fill evenly without the need for other hardware to cause this even filling.

A sleeve 32, which is tapered at a first end 38, is located within the diffuser 70. The sleeve 32 cooperates with the igniter 54 and igniter retainer assembly 52 to define a combustion chamber 33. The combustion chamber 33 encloses a package 40 which contains a solid gas generating material 42 hermetically sealed within it. The package may be formed of aluminum or any suitable material which may be hermetically sealed. A collar at one end 46 of the package is clamped between the igniter retainer assembly 52 and the second end 34 of the sleeve 32. The retainer ring and igniter support one end 46 of the package 40 against the pressure created when the gas generating material is ignited. The first end 38 of the sleeve 32 narrows to form a nozzle 39 which, in this embodiment, has a projectile 60 secured therein, for example by pressing. Surrounding the first end 38 of the sleeve 32 is a filter 28 which fits against the inside 73 of the diffuser 70 and is located between the end of the nozzle and the openings through the diffuser.

Fitting inside the igniter retainer assembly 52 is an igniter 54. The igniter 54 communicates with a sensor means (not shown) via electric contact pins 56. The sensor means can be of any type presently used in the art to sense a collision or sudden deceleration of a vehicle.

With reference to FIG. 3, there is great flexibility with regard to the assembly of the hybrid inflator. The hybrid inflator 10 may be thought of as consisting of four major assembly components, the igniter 54, the igniter retainer assembly 52, the pyrotechnic heater assembly 30, and the pressure vessel 12. To attach an igniter, an igniter 54 is simply inserted into the supporting ring 50 in the igniter retainer assembly 52. Preferably, the igniter is secured in place using an interference fit between the supporting ring 50 and the retainer ring 53. However, it is understood that the igniter may, if desired, be secured in place by threads, welding, adhesive or any other suitable means. To attach a pressure vessel, an end 17 of the pressure vessel 12 is joined in sealing relation to the diffuser 70 with a circumferential weld 78, as shown in FIGS. 1 and 2.

Figure 4:
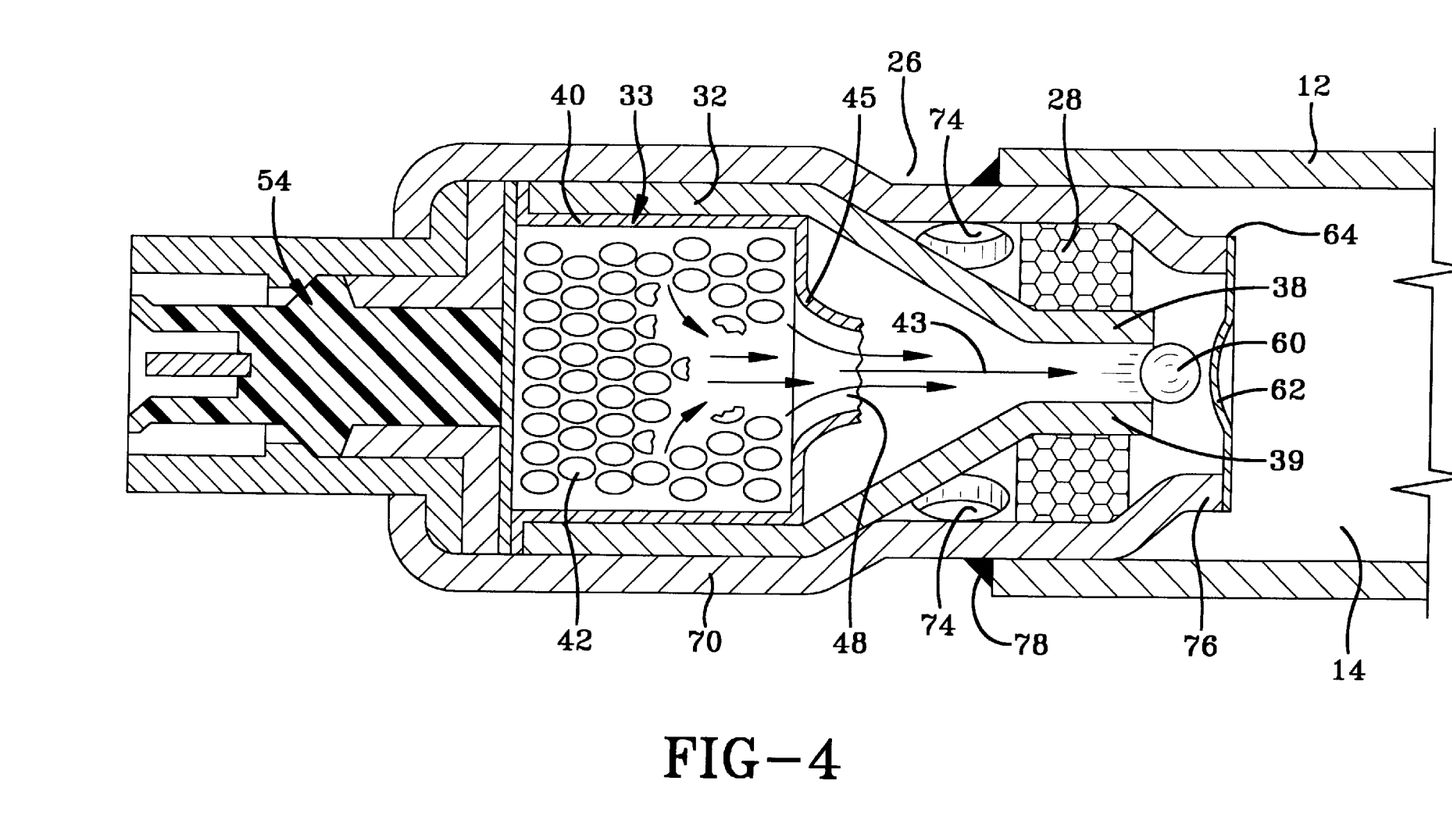
FIG. 4 is an enlarged, fragmentary crosssectional view of the hybrid inflator shown in FIG. 1 illustrating hot generated gas propelling a projectile towards a closure.

The operation of a hybrid inflator in accordance with this first embodiment may best be explained with reference to FIGS. 4, 5 and 6. With reference to FIG. 4, upon receiving an electric signal from a vehicle collision sensor (not shown) in response to a vehicle collision requiring deployment of a vehicle occupant restraint, the igniter 54 fires, igniting the solid gas generating material 42 inside the package 40. On ignition, the solid propellent 42 generates a hot gas which forces a first wall 45 of the package to structurally fail, forming an opening 48 which allows a flow 43 of the hot generated gas to escape the package 40. The flow 43 of hot generated gas then moves through the nozzle 39 formed at the first end 38 of the sleeve 32, propelling the projectile 60 into and rupturing the closure 62 thereby creating a orifice through the closure.

The effectiveness of the gas jet exiting the combustion sleeve, in rupturing the closure to create an orifice therethrough, depends greatly on the reduced diameter of the opening sealed by the closure as compared to the inner diameter of the pressure vessel. The opening sealed by the closure preferably has an area which is in the range of 40% to 60% of the area of the circular cross section of said storage chamber. Tests have shown that ratios greater than this allow increased deflection of the closure, thus allowing the closure to move away from the jet during opening. In addition, as the diameter of the opening sealed by the closure increases, the structural ability of the closure to hold back the stored gas decreases. Thicker materials must then be used to support this pressure load. Tests have shown that ratios smaller that this do not provide sufficient open area to allow the gas to exit the pressure vessel in a timely fashion. Fast airbag deployment times are specifically necessary for side impact applications.

Figure 5:
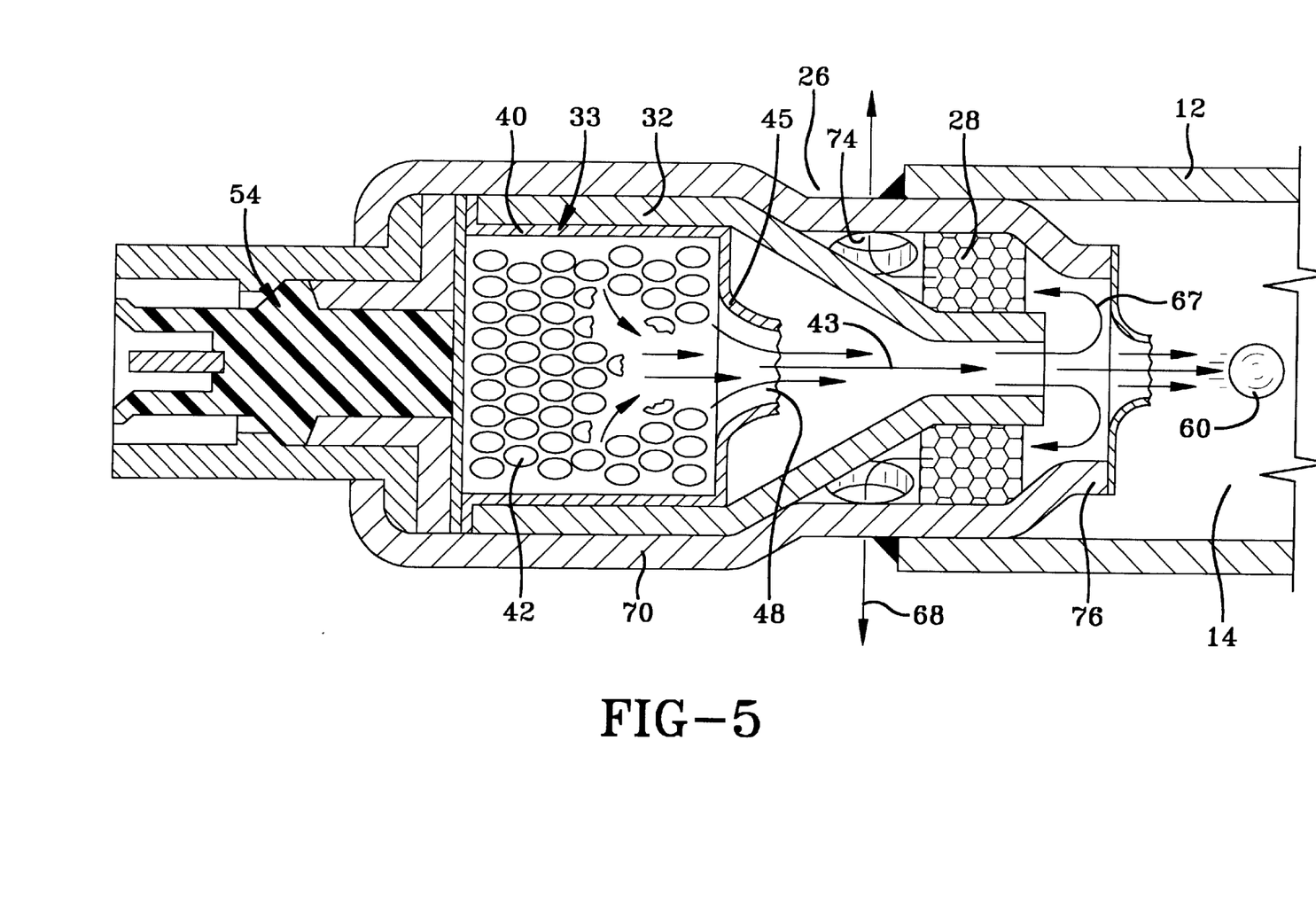
FIG. 5 is similar to FIG. 4 showing the flow path of the hot generated gas immediately after the projectile has ruptured the closure.

With reference to FIG. 5, hot generated gas flows both into the pressure vessel heating the stored gas and outward to the plenum. The shape and relative location of the nozzle to the closure 62 aids in efficient focusing of the hot generated gas onto the closure and into the storage chamber for heating purposes.

Figure 6:
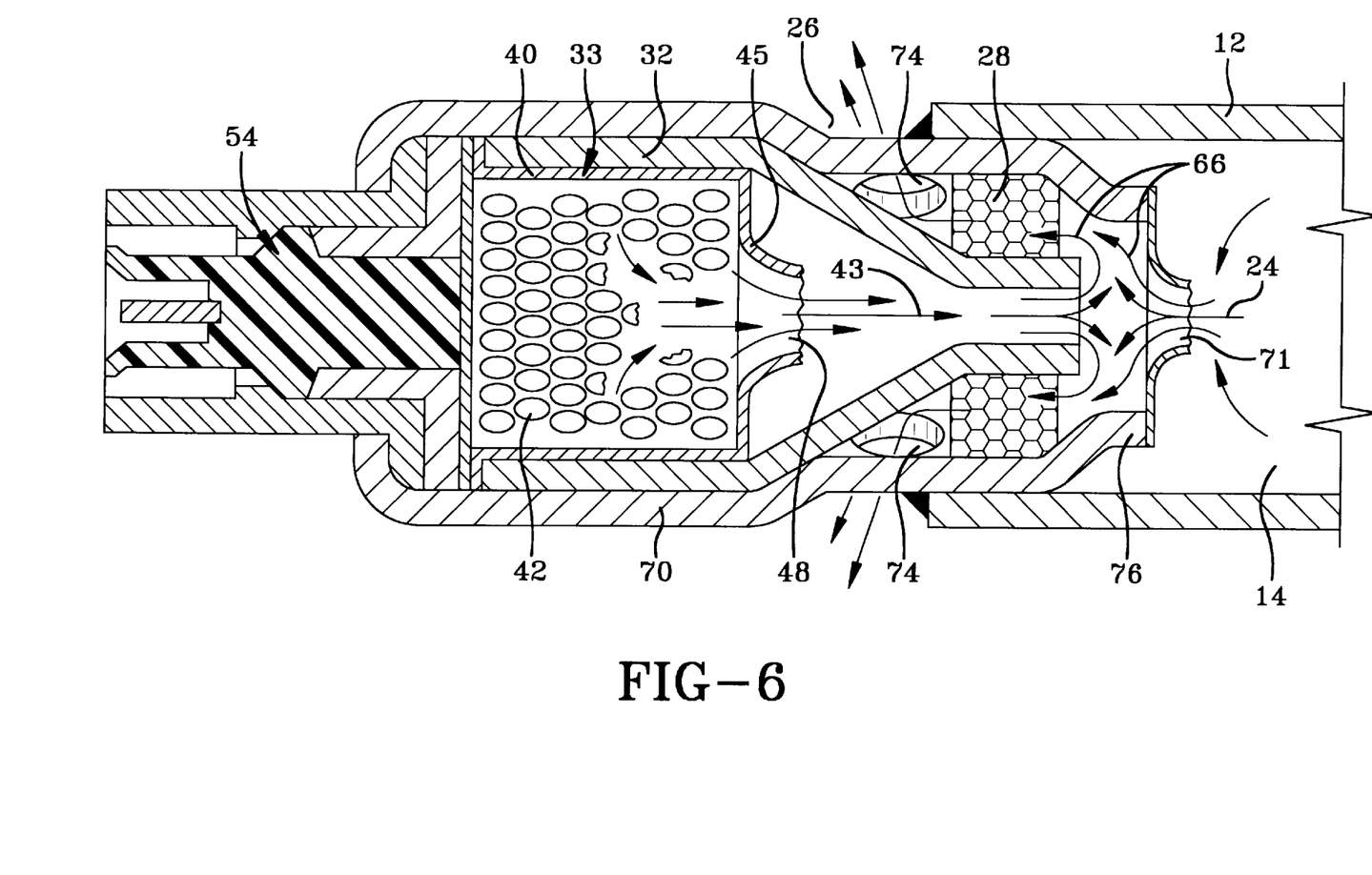
FIG. 6 is similar to FIG. 5 showing the flow paths for both the hot generated gas and the stored gas as they are both being discharged from the inflator.

Upon the rupturing of the closure a flow 24 of pressurized gas from the storage chamber 14 moves through the orifice 71 formed in closure 62 located at the first end 76 of the diffuser 70 as shown in FIG. 6. As the flow 24 of pressurized stored gas passes through the orifice 71 it joins the flow 43 of hot generated gas forming a mixed flow 66. The mixed flow 66 passes through the filter 28, through a plurality of openings 74, enters the plenum 26 which is formed by the pressure vessel 12 and the diffuser 70 and enters a vehicle occupant restraint (not shown).

With reference to FIG. 5, the relative dispositions of the sleeve 32 and the diffuser 70 directs the hot generated gas along a tortuous path as shown by arrows 43 67 and 68. This tortuous path creates at least two turns for the hot generated gas, a first turn 67 which is an 180° turn and a second turn 68 which is a 90° turn. Still referring to FIG. 5, this tortuous path 43, 67, 68 acts as a flash suppressor and aids the filter 28 in minimizing the emission of any fragments or particles which are a product of the combustion or the rupturing of the closure.

Figures 7, 8:
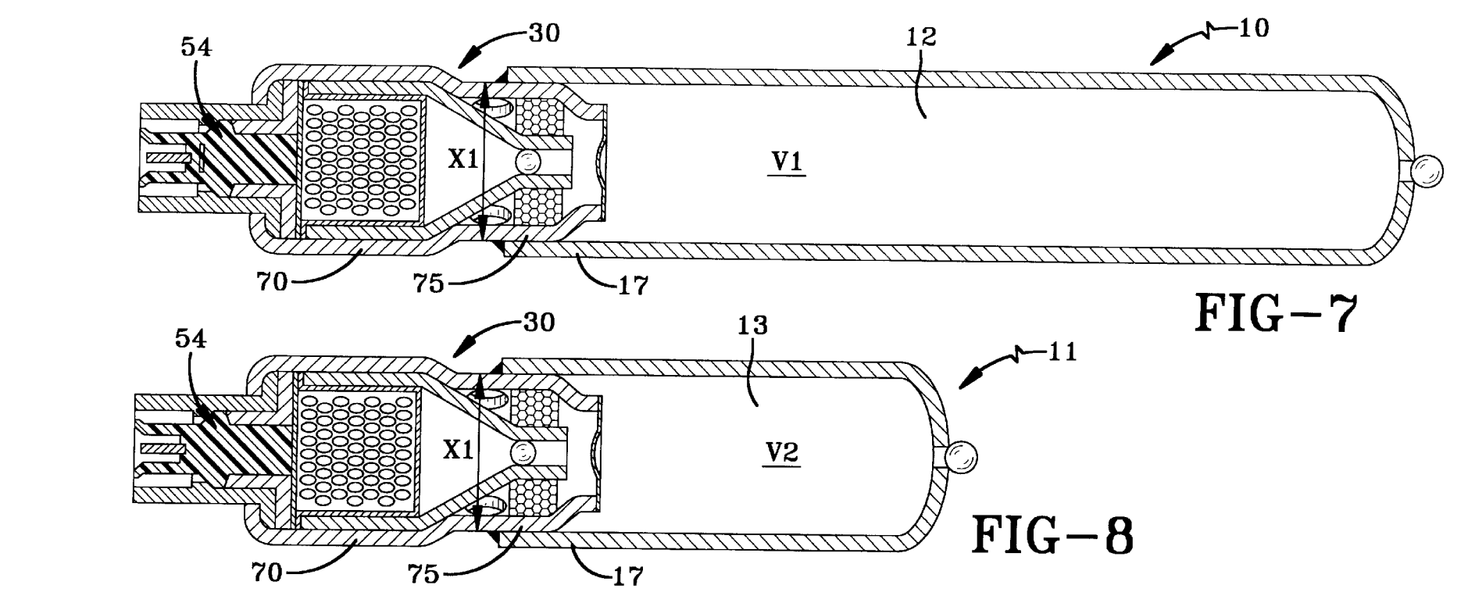
FIG. 7 is a longitudinal cross-sectional view of a first alternative embodiment of a hybrid inflator of the present invention.
FIG. 8 is a longitudinal cross-sectional view of a second alternative embodiment of a hybrid inflator of the present invention.

The flexibility of assembly of a hybrid inflator in accordance with the present invention is demonstrated by considering some of the possible hybrid inflator variations available using the same basic assembly process. For example, FIG. 7 shows a hybrid inflator 10 with a pyrotechnic heater assembly 30, a pin-type igniter 54 and a pressure vessel 12. The pyrotechnic heater assembly 30 has a vessel connection zone 75 with an outside diameter X1 on the diffuser 70. The pressure vessel 12 has a volume V1.

To construct an inflator with a smaller pressurized gas output, FIG. 8 shows a hybrid inflator 11 with the same pyrotechnic heater assembly 30 having the same vessel connection zone 75 with the same outside diameter X1 on the diffuser 70 and the same pin-type igniter 54. However, this hybrid inflator 11 has a smaller pressure vessel 13 having a volume V2 which is smaller than V1.

Figure 9:
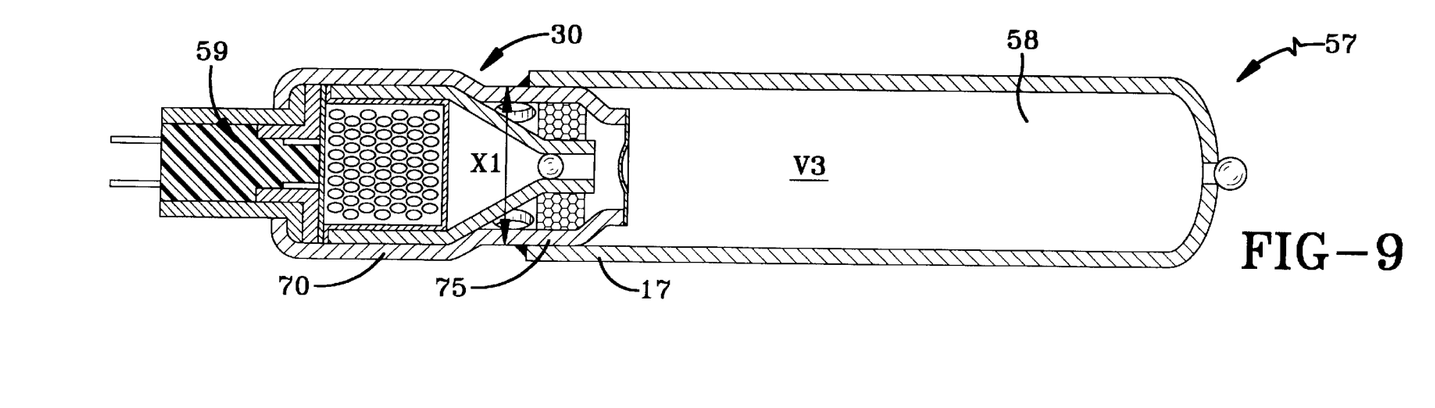
FIG. 9 is a longitudinal cross-sectional view of a third alternative embodiment of a hybrid inflator of the present invention.

To construct an inflator with a pressurized gas output between that shown in FIGS. 7 and 8, FIG. 9 shows a hybrid inflator 57 with the same pyrotechnic heater assembly 30 having the same vessel connection zone 75 with the same outside diameter X1 on the diffuser 70. However, this hybrid inflator 57 has a pressure vessel 58 with a volume V3 which is smaller than V1 but larger than V2. This hybrid inflator also differs from those shown in FIGS. 7 and 8 in that it has a leadwire type igniter 59. Other assembly variations are also possible.

Figures 10, 11:
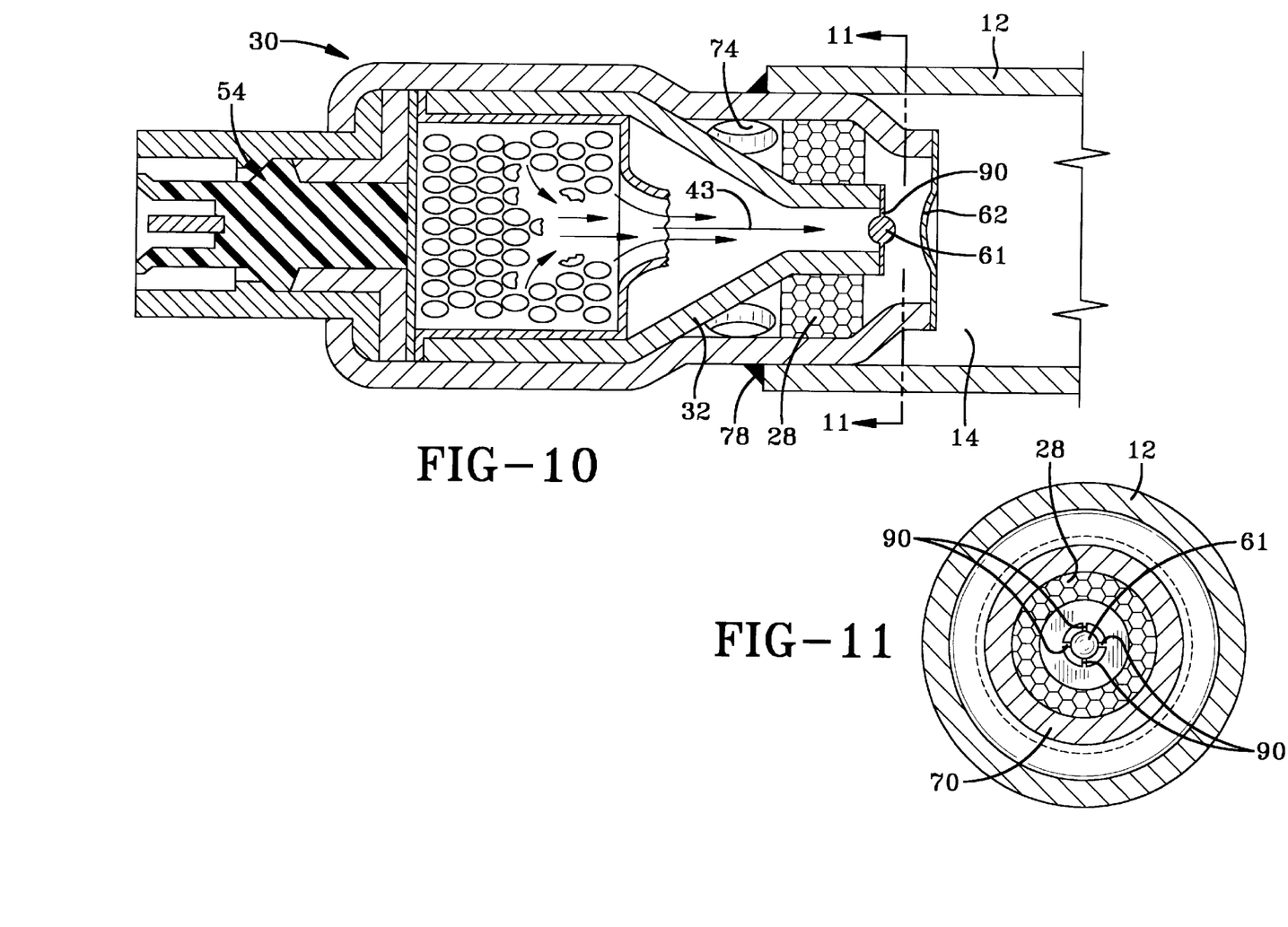
FIG. 10 is a fragmentary longitudinal crosssectional view of a fourth alternative embodiment of a hybrid inflator of the present invention.
FIG. 11 is a cross-sectional view taken along the line 11—11 of FIG. 10.

In another embodiment of this invention, shown in FIGS. 10 and 11, the projectile 61 used to rupture the closure 62 is not a separate piece but is a part of the sleeve 32. FIGS. 10 and 11 show a pressure vessel 12, a diffuser 70, and a filter 28. Frangible members 90 attach the projectile 61 to the nozzle 39. When the flow 43 of hot generated gas moves through the nozzle 39, it impacts the projectile 61, breaking it from the frangible members 90, and propelling the projectile 61 through the closure 62.

Figure 12:
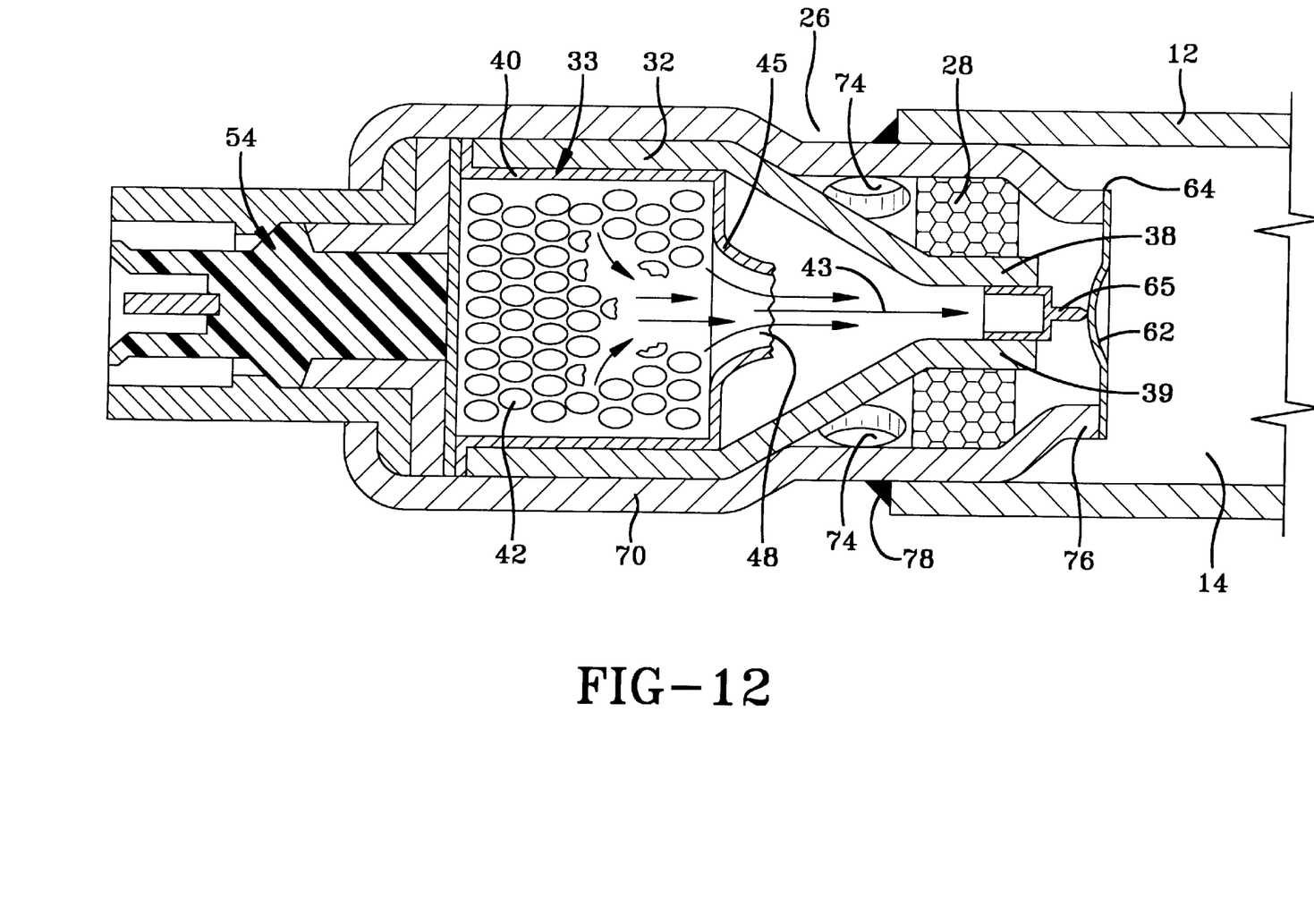
FIG. 12 is a fragmentary cross-sectional view of a fifth alternative embodiment of a hybrid inflator of the present invention.

In still another embodiment of this invention, FIG. 12 shows a structurally weakened closure 62 which requires support to keep the pressurized gas sealed within the vessel 12. This support is provided by a column 65 which may be a separate piece or simply an elongated combustion chamber. The separate piece would be pressed into the end of the combustion chamber. When the flow 43 of hot generated gas moves through the nozzle 39, it impacts the column 65, forcing the column to fail thus allowing the weakened closure to fail and release the stored gas.

Figure 13:
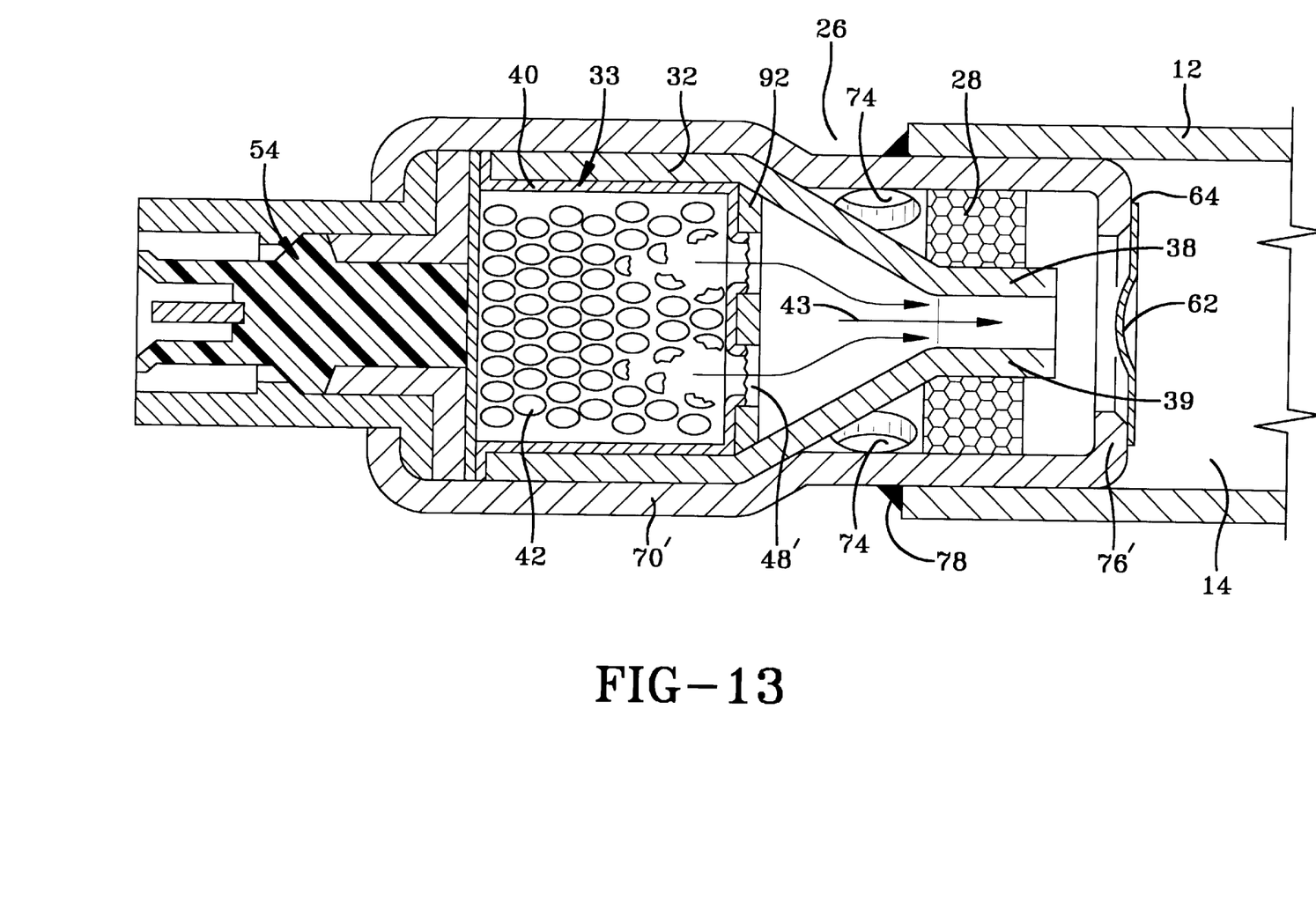
FIG. 13 is a fragmentary cross-sectional view of another embodiment of a sixth, and most preferred, alternative embodiment of a hybrid inflator of the present invention.

The preferred embodiment of the invention is shown in FIG. 13. This embodiment has a slightly different means for attaching the closure 62 to the diffuser 70', with a first end of the diffuser 76' located inside the pressure vessel. An orifice plate 92 is added to support the package 40. With this orifice plate 92 to support the package, the wall of the package ruptures at an elevated temperature and pressure forming an opening 48'. The resultant flow of hot generated gas is at an elevated temperature and pressure and rapidly erodes the closure 62, creating an orifice through the closure solely by hot gas without the use of a projectile as in the other embodiments.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

We claim:
1. A hybrid inflator for an airbag comprising:
a generally cylindrical vessel defining a storage chamber for containing a pressurized gas, said storage chamber having a circular cross section;
a pyrotechnic heater assembly at least partially located outside of the cylindrical vessel;
a generally cylindrical diffuser positioned about said pyrotechnic heater assembly, said diffuser is inserted into the generally cylindrical vessel wherein a first end of the diffuser is located inside the storage chamber;
a plenum is formed by an end of the vessel and a portion of the diffuser; and
a closure which is assembled with the first end of the diffuser which extends across a portion of the cross section of the storage chamber and defines a circular opening, said closure extending across said circular opening to provide a pressure seal between the storage chamber and the diffuser, wherein said pyrotechnic heater assembly creates an orifice through said closure.
2. The hybrid inflator for an airbag of claim 1 wherein the pyrotechnic heater assembly creates the orifice through said closure solely by hot gas.
3. The hybrid inflator for an airbag of claim 2 wherein the diffuser has a plurality of openings therethrough for venting gas from the inflator, and the hot gas is directed towards the closure through a nozzle with an end of said nozzle which is proximal to the closure being nearer to the closure than the openings through the diffuser.
4. The hybrid inflator for an airbag of claim 3 further comprising a filter located between the end of the nozzle and the openings through the diffuser.
5. The hybrid inflator for an airbag of claim 1 wherein the pyrotechnic heater assembly creates the orifice through said closure by propelling a projectile through the closure.
6. The hybrid inflator for an airbag of claim 5 wherein the diffuser has a plurality of openings therethrough for venting gas from the inflator, and the projectile is directed towards the closure through a nozzle with an end of said nozzle which is proximal to the closure being nearer to the closure than the openings through the diffuser.
7. The hybrid inflator for an airbag of claim 6 further comprising a filter located between the end of the nozzle and the openings through the diffuser.
8. The hybrid inflator for an airbag of claim 1 wherein the diffuser is connected to the cylindrical vessel by a circumferential weld.

9. A hybrid inflator for an airbag comprising:
a generally cylindrical vessel defining a storage chamber for containing a pressurized gas, said storage chamber having a circular cross section;
a pyrotechnic heater assembly at least partially located outside of the cylindrical vessel;
a generally cylindrical diffuser around said pyrotechnic heater assembly, the diffuser is inserted into the generally cylindrical vessel, the diffuser being connected to the cylindrical vessel, the diffuser having a reduced diameter portion which is located inside the generally cylindrical vessel and defines a circular opening;
a plenum is formed by an end of said vessel and a portion of the diffuser;
a closure which is assembled with the reduced diameter portion of the diffuser and extends across said circular opening to provide a pressure seal between the storage chamber and the diffuser, wherein the pyrotechnic assembly creates an orifice through said closure.

10. The hybrid inflator for an airbag of claim 9 wherein the pyrotechnic heater assembly creates the orifice through said closure solely by hot gas.

11. The hybrid inflator for an airbag of claim 10 wherein the diffuser has a plurality of openings therethrough for venting gas from the inflator, and the hot gas is directed towards the closure through a nozzle with an end of said nozzle which is proximal to the closure being nearer to the closure than the openings through the diffuser.

12. The hybrid inflator for an airbag of claim 11 further comprising a filter located between the end of the nozzle and the openings through the diffuser.

13. The hybrid inflator for an airbag of claim 9 wherein the pyrotechnic heater assembly creates the orifice through said closure by propelling a projectile through the closure.

14. The hybrid inflator for an airbag of claim 13 wherein the diffuser has a plurality of openings therethrough for venting gas from the inflator, and the projectile is directed towards the closure through a nozzle with an end of said nozzle which is proximal to the closure being nearer to the closure than the openings through the diffuser.

15. The hybrid inflator for an airbag of claim 14 further comprising a filter located between the end of the nozzle and the openings through the diffuser.

16. A hybrid inflator for an airbag comprising:
a generally cylindrical vessel defining a storage chamber for containing a pressurized gas, said storage chamber having a circular cross section;
a pyrotechnic heater assemble;
a generally cylindrical diffuser positioned about said pyrotechnic heater assembly, said diffuser is inserted into the cylindrical vessel wherein an end of said vessel and a portion of said diffuser form a plenum;
a first end of said diffuser is located inside the storage chamber, said first end having a circular opening; and
a closure, which is assembled with the first end of the diffuser, said closure extending across said circular opening to provide a pressure seal between the storage chamber and the diffuser.

17. The hybrid inflator for an airbag of claim 16 wherein the pyrotechnic assembly is positioned at least partially outside of the pressure vessel.

18. The hybrid inflator for an airbag of claim 16 wherein the pyrotechnic assembly creates an orifice through said closure solely by hot gas.

* * * * *